United States Patent
Ernst

(10) Patent No.: US 8,326,710 B2
(45) Date of Patent: Dec. 4, 2012

(54) SYSTEM AND METHOD FOR GENERATING AND TRACKING FIELD VALUES OF MORTGAGE FORMS

(75) Inventor: Carl R. Ernst, Scottsdale, AZ (US)

(73) Assignee: Ernst Publishing Co., LLC, Scottsdale, AZ (US)

( * ) Notice: Subject to any disclaimer, the term of this patent is extended or adjusted under 35 U.S.C. 154(b) by 252 days.

(21) Appl. No.: 12/627,581

(22) Filed: Nov. 30, 2009

(65) Prior Publication Data

US 2011/0131119 A1 Jun. 2, 2011

(51) Int. Cl.
*G06F 17/22* (2006.01)

(52) U.S. Cl. ............ 705/31; 705/36 R; 705/1.1; 705/35; 709/204; 707/719; 707/E17.131

(58) Field of Classification Search ...... 705/31, 705/35; 707/719, E17.131
See application file for complete search history.

(56) References Cited

U.S. PATENT DOCUMENTS

| | | | |
|---|---|---|---|
| 5,946,668 A * | 8/1999 | George | 705/36 R |
| 5,966,700 A * | 10/1999 | Gould et al. | 705/38 |
| 6,993,502 B1 * | 1/2006 | Gryglewicz et al. | 705/31 |
| 7,366,694 B2 | 4/2008 | Lazerson | |
| 7,742,991 B2 * | 6/2010 | Salzmann et al. | 705/51 |
| 7,783,536 B2 * | 8/2010 | William et al. | 705/31 |
| 7,860,763 B1 * | 12/2010 | Quinn et al. | 705/31 |
| 8,015,083 B1 * | 9/2011 | Sterling et al. | 705/31 |
| 8,019,664 B1 * | 9/2011 | Tifford et al. | 705/31 |
| 2002/0184148 A1 * | 12/2002 | Kahn et al. | 705/40 |
| 2003/0033241 A1 * | 2/2003 | Harari | 705/38 |
| 2005/0108028 A1 * | 5/2005 | Arehart | 705/1 |
| 2005/0261995 A1 * | 11/2005 | Phelan | 705/31 |
| 2008/0010178 A1 * | 1/2008 | Savard | 705/31 |
| 2010/0153259 A1 * | 6/2010 | Stanton | 705/38 |

* cited by examiner

*Primary Examiner* — Vanel Frenel
(74) *Attorney, Agent, or Firm* — Brinks Hofer Gilson & Lione

(57) ABSTRACT

A system for generating field values of mortgage forms. The system includes a database, a calculation module, a monitoring module. The database contains jurisdictional tax and fee information used to calculate field values for the mortgage form. The calculation module is configured to calculate field values for the mortgage form and to generate a transaction log for mortgage and related transactions. The monitoring module communicates with the database and identifies when changes in the field values of tax and fee information occur in the transaction log, and report those changes to the affected lender.

18 Claims, 12 Drawing Sheets

Monitor Notice

Date Change posted: April 5, 2009 ~1012

Ernst Watch Number: 02152000912345 ~1014

Subscriber Applicant No.: AA67891 ~1016

(Latest Inquiry dated March15, 2009) ~1018

At: Albany County, NY Recording Office ~1020

Change: State tax increased by $1.00 from $4.00 to $5.00 per $1,000 of consideration imposed as of may 15, 2009

Estimated Closing Date: June 1, 2009 [in version 2.0] ~1024

Consideration: $400,000 ~1026
Prior GFE Transfer tax: $1,600.00 ~1028
New GFE Transfer tax: $2,000.00 ~1030

Change: Shortage $400.00 25% Increase ~1032

Notes:
Increase is in effect prior to estimated closing date. ~1034

Recommendation: Send revised GFE. ~1036

Change: State tax increased by $1.00 from $4.00 to $5.00 per $1,000 of consideration imposed as of May 15, 2009

GFE Item #8 —1116
Change Date: May 5, 2009 —1118
Recommendation: Send revised GFEs. —1118

| Applicant Number | Date of Latest GFE | Amount Before Change | Amount After Change | Change | %Change |
|---|---|---|---|---|---|
| 1234 | April 1, 2009 | $1,600.00 | $2,000.00 | $400.00 | 25% |
| 5678 | March 31, 2009 | $800.00 | $1,000.00 | $200.00 | 25% |
| 9100 | April 5, 2009 | $1,000.00 | $1,250.00 | $250.00 | 25% |
| 9120 | May 1, 2009 | $14,000.00 | $15,000.00 | $1,000.00 | 25% |
| 9200 | April 28, 2009 | $400.00 | $500.00 | $100.00 | 25% |

FIGURE 11

SYSTEM AND METHOD FOR GENERATING AND TRACKING FIELD VALUES OF MORTGAGE FORMS

BACKGROUND

1. Field of the Invention

The present invention generally relates to a system and method for generating and tracking field values used in mortgage forms.

2. Description of Related Art

Mortgage information is gathered at various times throughout the mortgage application and closing processes. However, typically mortgage information is gathered and used by different entities at different times during the process. For example, the loan originator may be a different entity from the lending institution. In addition, many lending institutions will utilize the services of a closing agent, such as a title company, to close the transaction between the borrower and the lender. Currently, there is no good way to coordinate the passing of information between these entities. In addition, the information required on the forms often requires complex calculations, combinations of underlying information, and may change over time. For example, in calculating a good faith estimate (GFE), the method of calculating taxes and fees may vary significantly based on jurisdiction. Further, the taxes may change between the time the loan is originated and the time of closing. If this happens, the customer may need to be notified within a certain time period and prior to the actual closing of the loan. If these changes and errors are not identified timely, the lending institution may incur significant additional costs.

In view of the above, it is apparent that there exists a need for an improved system and method for generating and tracking field values of mortgage forms.

SUMMARY

In satisfying the above need, as well as overcoming the enumerated drawbacks and other limitations of the related art, the present application provides a system and method for generating and tracking field values of mortgage forms.

The system includes a database, a calculation module, a monitoring module, a reconciliation module and an analysis module. The database contains jurisdictional tax and fee information used to calculate field values for the mortgage form. The calculation module is configured to calculate the field values for the mortgage form. For example, the system may calculate field values for the good faith estimate and later calculate field values for the HUD-1 form. The monitoring module communicates with the database and transaction logs to identify changes in the jurisdictional tax and fee information used to calculate field values for the mortgage form. The reconciliation module compares related mortgage forms for variations between them. Finally, after the transaction has closed, an analysis module analyzes many transactions for trends, compliance audits and adjustment of estimates.

Each module may provide an output to the interface module, which may then be communicated to lending institutions or consumers in electronic, paper, or other form. The calculation module may transmit the field values of mortgage forms calculated based on jurisdictional and tax information. The monitor module may transmit notifications based on changes in jurisdictional and tax information. The reconciliation module may transmit reconciliation reports between mortgage forms. The analysis module may transmit the results of statistical and other bulk analyses.

The system may also include transactional logs (e.g. databases) configured to store field values for each mortgage form based on a transaction identification. The monitoring module can query transactions from the transactional database based on an applicant unique key, a transaction jurisdiction and/or a date (e.g. the closing date) according to a change in the tax and fee information for the transaction jurisdiction and the output module may send the notification based on the query.

In another aspect of the application, the system may include a reconciliation module configured to identify differences in the field values calculated by the calculation module relative to previously calculated field values for a previously calculated form. In addition, the reconciliation module may be configured to transmit a notification of the difference between the field values calculated by the calculation module and the previously calculated field values from the previously calculated form.

The system may also include an analysis module in communication with a statistical database of transactions. The form comparison module stores differences between the field values of a mortgage form and field values of the related, previously calculated mortgage form in the statistical database for later analysis.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

FIG. 10 is an illustration of an account report;

FIG. 11 is an illustration of a group report; and

DETAILED DESCRIPTION

Figure 1:
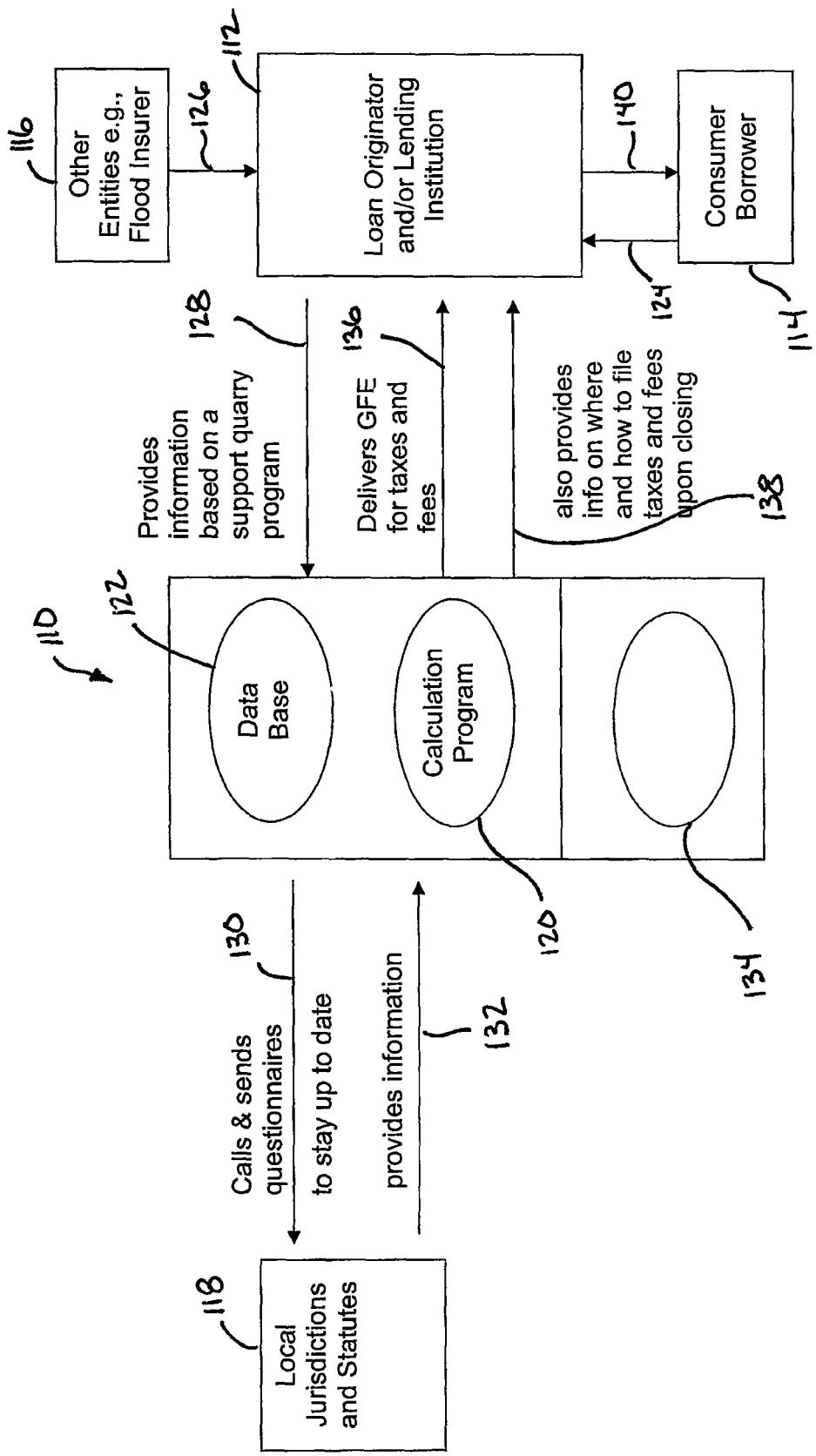
FIG. 1 is a block diagram illustrating a system for preparing mortgage forms in accordance with one embodiment of the invention.

Referring now to FIG. 1, a system embodying the principles of the present application is illustrated therein and designated by reference numeral 110. The system 110 includes a calculation module 120 and a database 122. The system 110 is configured to generate and deliver field values, such as the field values of a good faith estimate for loan origination or lending institutions 112. In a typical scenario, the consumer 114 wishes to get a loan from the loan originator or lending institution 112. As such, the consumer 114 provides consumer information 124 to the loan originator or lending institution 112. In order to evaluate the loan application, the loan originator or lending institution 112 may also retrieve information from other support entities 116. The other entities 116 may for example, include title companies, flood insurers, appraisers, or other institutions that will be involved in the closing process. The information from the other entities 116 is provided to the loan originator or lending institution 112 as denoted by line 126.

The loan originator or lending institution 112 must provide certain mortgage forms to the consumer 114. For example, a good faith estimate of the loan costs must be provided to the consumer 114. To facilitate generation of the good faith estimate, the loan originator or lending institution 112 provides loan information 128 to the system 110. The loan information 128 may include the consumer information 124, the information for the other entities 126, property information, as well as additional information generated by the loan originator or lending institution 112. The system 110 includes a database 122 with up to date information for recording taxes and fees charged by each state or local jurisdiction.

The system 110 requests information periodically from local jurisdictions and states to update the tax and fee information in the database 122. The request 130 may be a request that is manually processed (e.g. a survey or request letter) or, alternatively, may be an electronic request for manually or electronically stored information from the local state and local jurisdictions 118. In turn, the state and local jurisdictions 118 provide an updated fee and tax information 132 to the system 110 and the system 110 updates the database 122. The information 132 may be provided manually from the state and local jurisdictions 118, for example by fax, which would require manual entry into the database 122. If the request 130 is electronically provided to the states and local jurisdictions 118, the information 132 could be provided to the system in an electronic format. For example, the information 132 may be provided over the internet or through a form of mailed electronic media (e.g. CD or DVD) which may be automatically loaded into the database 122 to update the tax and fee information.

After the tax and fee database 122 is updated, the system 110 can then calculate the field values for the good faith estimate using the calculation module 122. The system 110 may then store the calculated field values for the mortgage form (e.g. tax and fee values) into a transaction database 134 based on a transaction ID. Further, the field values of the mortgage form may be provided along with the transaction ID to the loan originator or lending institution 112 as denoted by line 136. In addition, the system 110 may also provide information on where and how to file the taxes and fees upon closing to the loan originator or lending institution 112 as denoted by line 138.

The mortgage forms may be printed at the loan originator or lending institution 112 facility or electronically stored on computers at the facility of the loan originator or lending institution 112. The loan origination or lending institution 112 may provide the completed mortgage forms including the good faith estimate to the consumer 114 as denoted by line 140.

As discussed above, the system 110 can request updated tax or fee information 132 from the state or local jurisdictions 118. As such, the system 110 can be configured to monitor changes that would affect the mortgage forms. When changes are identified, the system 110 can recalculate the field values of mortgage forms, and specifically the good faith estimate, based on the new tax and fee information. The system 110 can forward the updated good faith estimate to the loan originator 112 thereby ensuring the consumer 114 can be notified of changes that may occur between the loan application and the closing.

Figure 2:
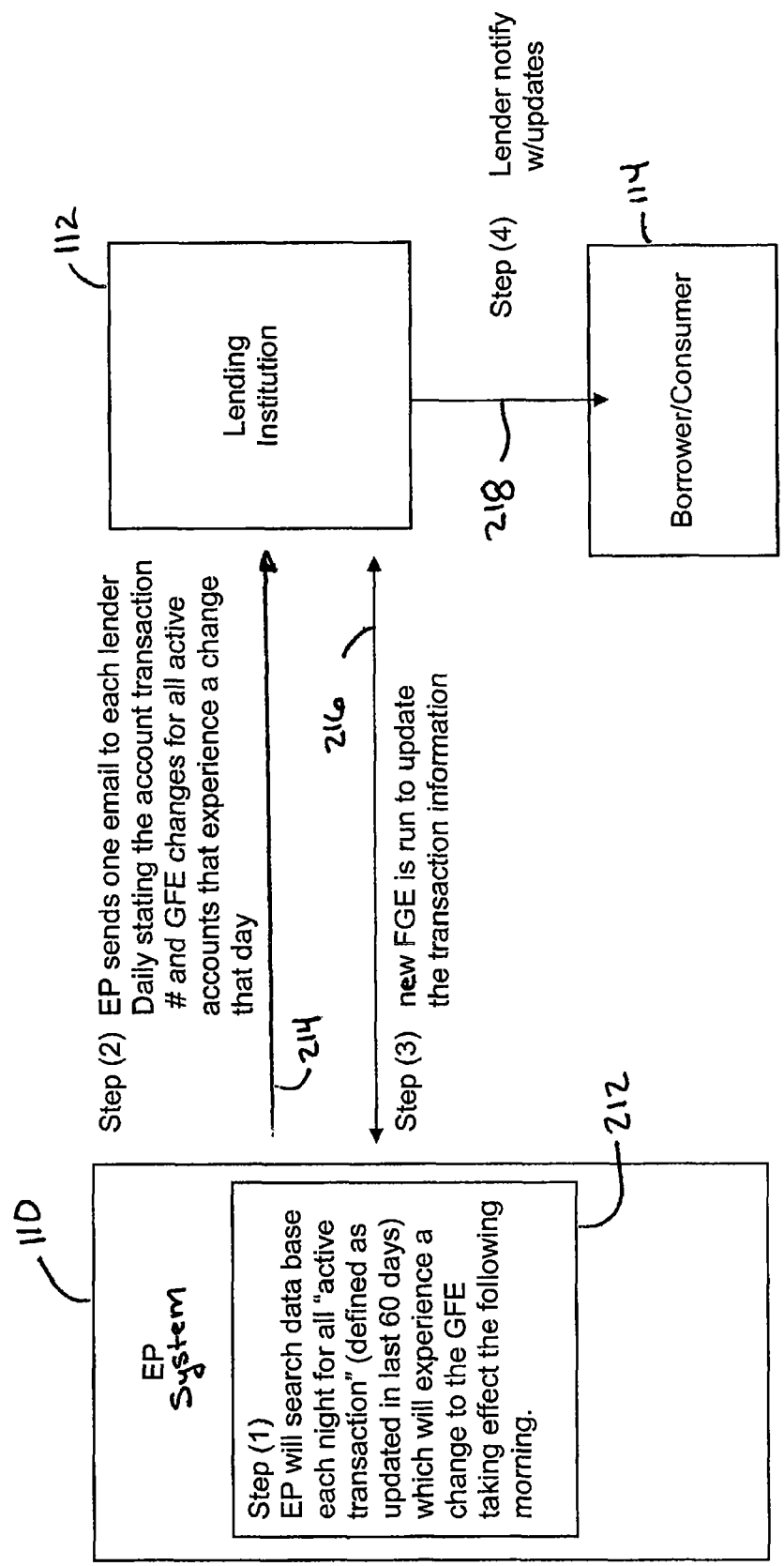
FIG. 2 is a block diagram illustrating a process for monitoring and updating jurisdictional information.

One method for monitoring tax and fee changes is illustrated in FIG. 2. Monitoring tax and fee changes can be beneficial as jurisdictions may, typically, change their tax or fee calculation methods once or twice a year. Further, additional regulations may soon come into place where the lender must notify the borrower of these changes promptly or be penalized. As such, continually monitoring such changes may have increased importance for loan originators and lending institutions. As denoted by block 212, the system 110 will search its database each night for all active transactions which will experience or have already experienced a change that affects the good faith estimate. Active transactions may be defined as consumer applications that have been received within a certain time period, for example the last sixty days. The system 110 may then send a report, by email or other means, to each lender daily identifying the account transaction number and good faith estimate changes for all active accounts to which the change may apply. The lending institution 112 may automatically or manually request that field values for a new good faith estimate is calculated to update the transaction information as denoted by line 216. As such, the lending institution 112 may notify the consumer 114 about the changes in the good faith estimate as denoted by line 218. In one example, the lending institution 112 may provide the consumer 114 with the updated good faith estimate by printing and mailing a new good faith estimate form to the consumer 114. Alternatively, the lending institution may have a software module forming part of the system 110 that remotely resides at the lending institution 112 that automatically generates an email with updated good faith estimate to the consumer 114. Whenever a change to a field value in the database generate a change in the corresponding field value detected by the monitor module for a borrower, a monitor report can be forwarded to the lender, identifying the change in enough detail for the lender to determine based on its own internal policies whether the change is significant enough to require reissuing a corrected good faith estimate, the monitor module maintains a database of the changes that allows the lender to apply automated methods to generate the new good faith estimate. If the lender produces a new good faith estimate, when the field values for the new good faith estimate are generated from the calculation module, the system then recognizes the new transaction as the current transaction record for use in future monitoring.

Figure 3:
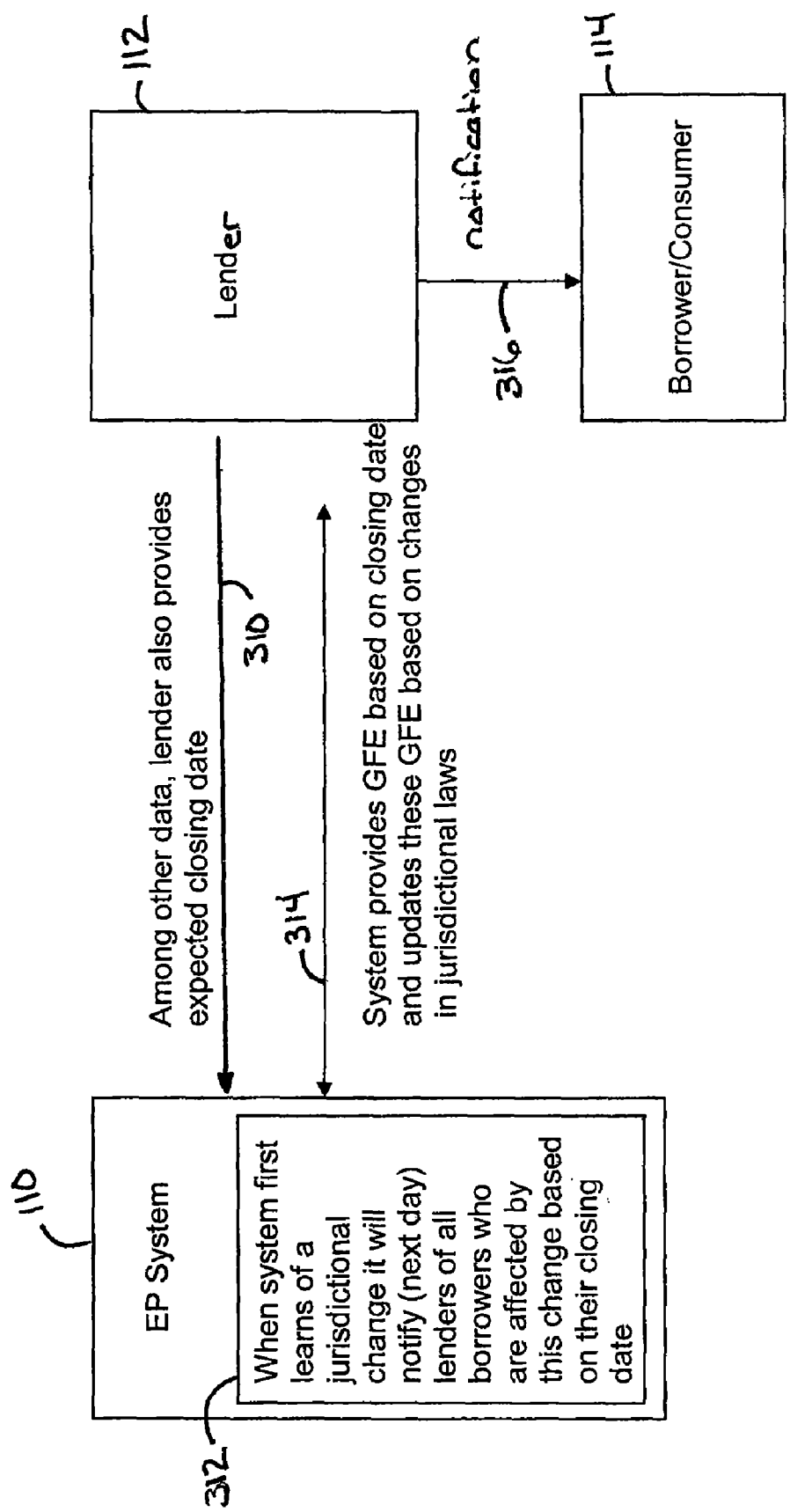
FIG. 3 is another block diagram illustrating a process for monitoring and updating jurisdictional information.

Another method for monitoring changes in a good faith estimate is illustrated in FIG. 3. As denoted by 310, the lender 112 provides the expected closing date to the system 110 along with all the other required loan information (as described above with regard to the loan information 128 in FIG. 1). The system 110 identifies the lenders of all borrowers who are affected by the jurisdictional change based on their closing date, as denoted by block 312. In one example, the updated field values are provided when the closing date is less than a predetermined time period from the current date. The system 110 may then provide updated field values for the good faith estimate based on the closing date and the changed jurisdiction taxes and fees, as denoted by line 314. As such, the lender 112 can notify the consumer 114 of a change in the good faith estimate, as denoted by line 316.

Figure 4:
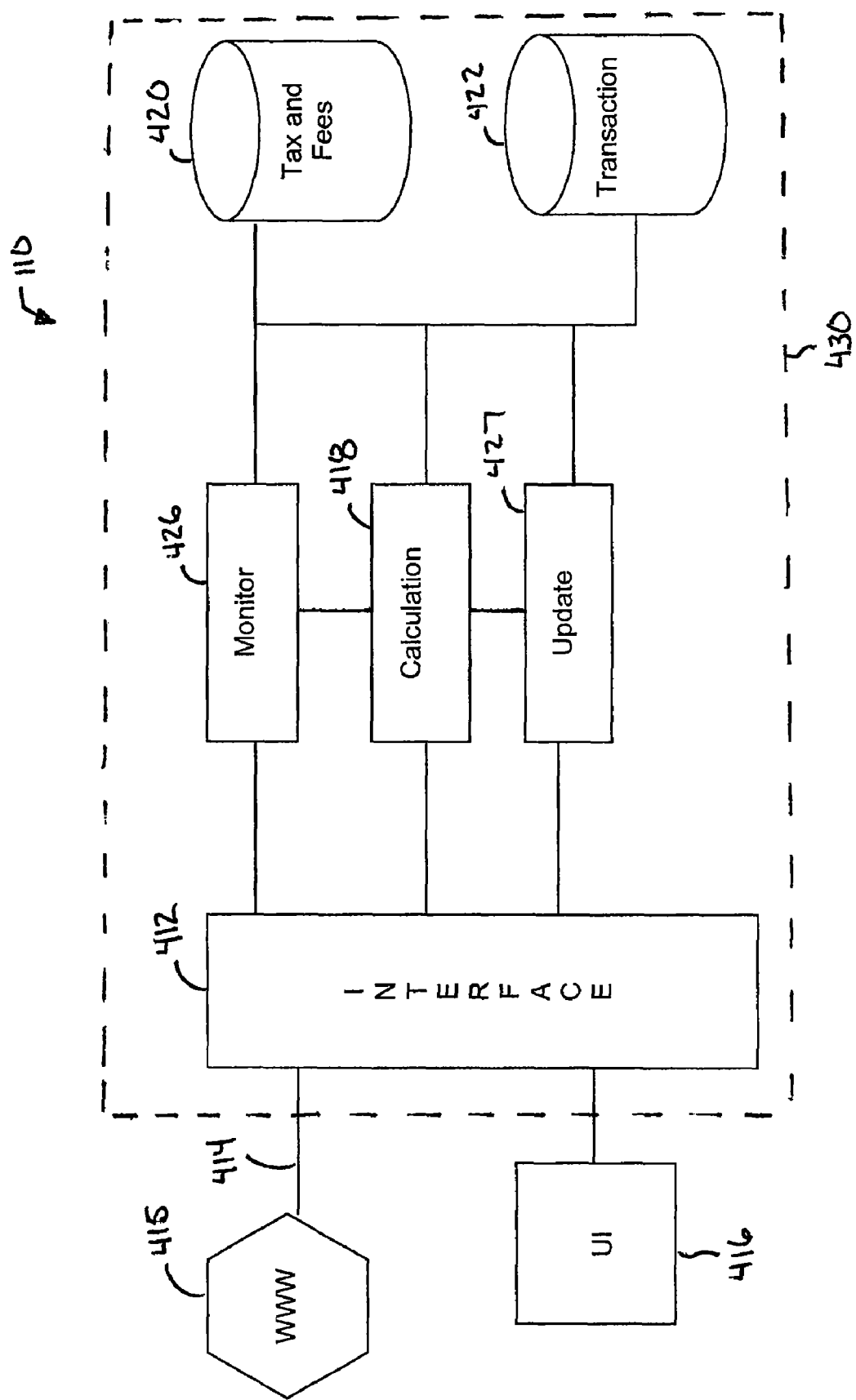
FIG. 4 is a block diagram illustrating a system for generating and monitoring field values of mortgage forms.

Now referring to FIG. 4, a more detailed diagram of the system 110 is provided. The system 110 may include an interface module configured to communicate with the lending institution 112 through a network connection 414. The network connection 414 may communicate with the lending institution 112 through an internet connection over the worldwide web, as denoted by reference numeral 415. In addition, the interface module 412 may communicate over the network connection 414 to retrieve updated tax and fee information from state and local jurisdictions 118 as denoted in the monitoring processes provided above. The interface module 412 may also be in communication with a user interface 416 to allow manual input of updated tax and fee information for state and local jurisdictions. The user interface 416 may be a graphical user interface including a monitor for displaying tax and fee information, as well as other transaction information. The user interface 416 may also include an input device, such as a keyboard or mouse, to modify such information in the databases. The interface module 412 is in communication with the calculation module to receive the loan information from the lending institution or loan originator 112. The calculation module 418 may retrieve the tax and fee information from the database 420 based on the jurisdiction provided in the loan information. Based on the loan information provided by the lending institution 112 and the tax and fee information retrieved from the database 420, the calculation module may calculate the field values for the mortgage form (e.g. the good faith estimate). In another example, the calculation module 418 may calculate field values for the good faith estimate and later calculate field values for the HUD-1 form. The calculation module 418 may save the field values along with a transaction identification key into the transaction database 422 for later retrieval or manipulation. The calculation module 418 may also provide the field values for the mortgage forms to the interface module 412 as an output of the calculation module 418. The calculation module output may include the field values formatted for transmission to the lending institution 112. For example, the calculation module 418 may provide field values for the good faith estimate in an XML format, a delimited data format, a PDF format (such as a filled form), or any other data interface format. Accordingly, the calculation module 418 is in communication with the interface module 412 for transmitting field values of the mortgage forms (e.g. the good faith estimate) over the network connection 414 to the lending institution or loan originator 112.

In addition, the monitoring module 426 may be in communication with the interface module 412 to receive updated tax and fee information from the state or local governments over the network connection 414. The monitoring module 426 communicates with the database 420 and transaction logs 422 to identify changes in the jurisdictional tax and fee information used to calculate field values for the mortgage form. For example, as described above, the updated tax and fee information may be provided automatically in electronic format from the state and local jurisdictions 118 over the internet 415. As such, the interface module 412 could receive the updated tax and fee information through the network connection 414 and provide the updated tax and fee information to the monitor module 426. In addition, the updated tax and fee information may be manually provided over the user interface 416 to the interface module 412. As such, the interface module 412 would provide the updated tax and fee information to the monitor module 426.

In another example, an update module 427 may update the tax and fee information in the tax and fee database 420 based on information received from the interface module 412, as described above. The monitor module 426 may query the tax and fee information in the tax and fee database 420 to indentify changes. As such, the calculation module 418 may receive a request from the monitor module 426 to recalculate the field values based on the transaction information from the transaction database 422 and the updated tax and fee information from the tax and fee database 420. The request from the monitor module 426 may be based on a query of the transaction database 422 for transactions that match jurisdictions with updated tax and fee information. Alternatively, the monitor module 426 may issue the request based on the transaction closing date or a combination of such information.

The monitor module 426 may be provided to compare the field values calculated by the calculation module 418 to previous field values calculated with the previous tax and fee information. As such, the monitor module 426 may retrieve the previous field values from the transaction database 422 for comparison with the updated field values provided by the calculation module 418 (based on the updated tax and fee information). If the monitor module 426 identifies a difference in the field values calculated with the new tax and fee information relative to the previous field values, the output module 424 may transmit updated field values (e.g. updated transfer taxes and recording fees for an updated good faith estimate) to the interface module 412 for transmission to the loan originator or lender 112 through the network connection 414. In one example, a monitor module output may include a report comparing changes in government laws and local usage to the content of previously recorded transactions for the same recording jurisdiction.

The modules described relative to FIG. 4 may be implemented all on one server as denoted by dotted line 430. Alternatively, the modules may be implemented on multiple servers that are connected through a local area network connection. For example, each module and database could be implemented on a separate server where each module and database communicates through an Ethernet connection over a distributed software interface.

Figure 5:
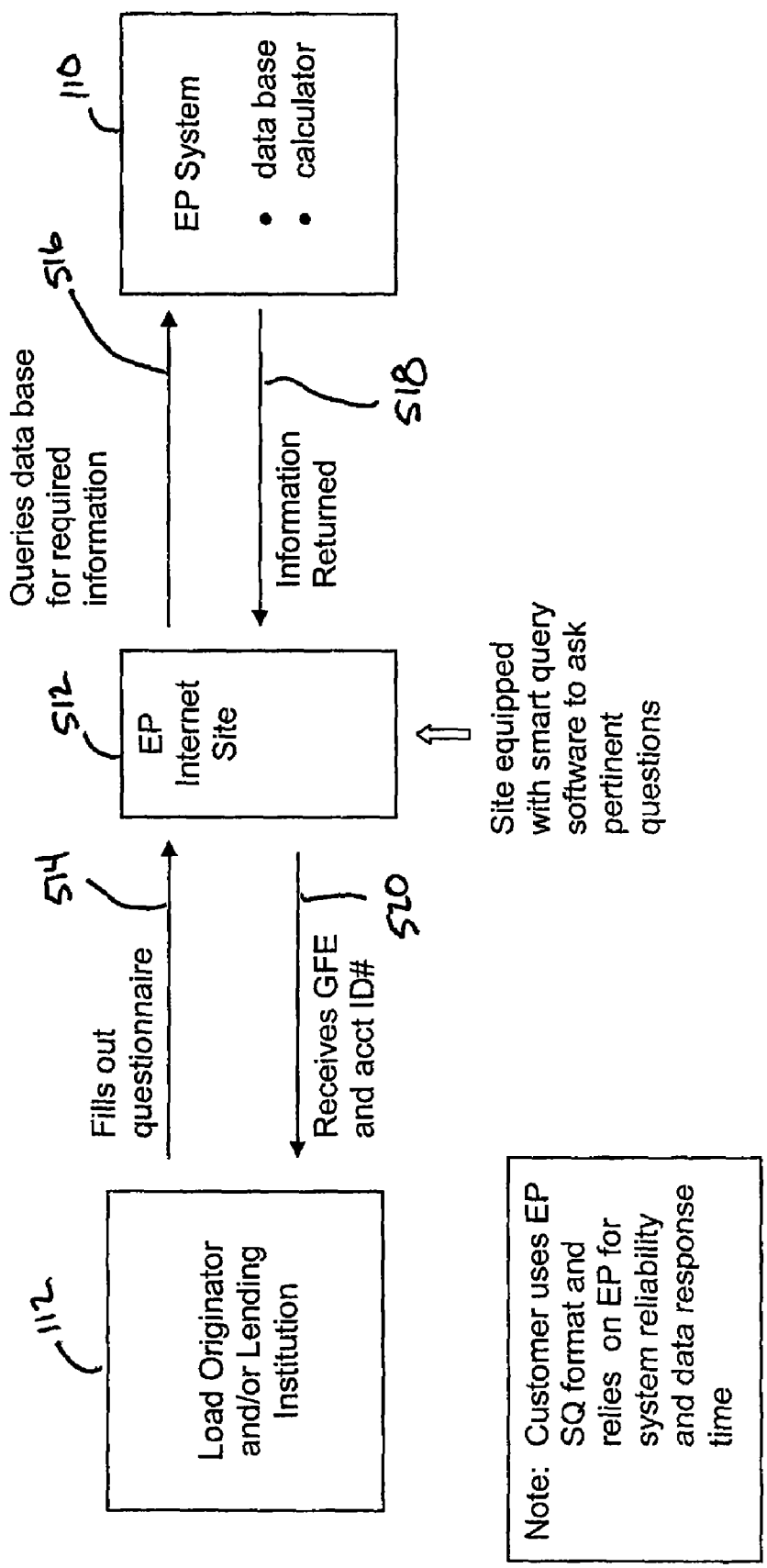
FIG. 5 is a block diagram illustrating a system for generating and monitoring field values of mortgage forms with a web site.
Figure 6:
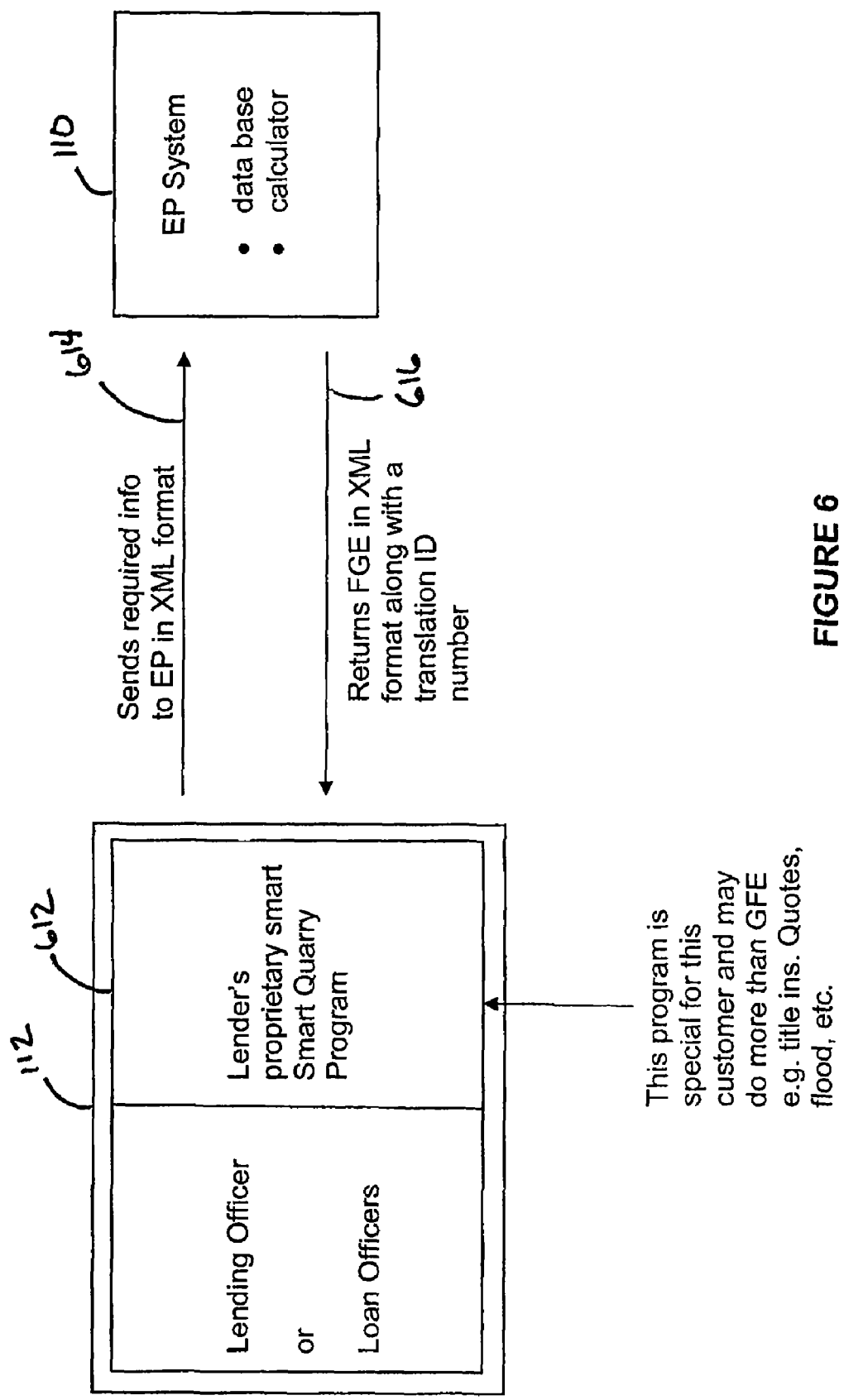
FIG. 6 is a block diagram illustrating a system for generating and monitoring field values of mortgage forms with a customized software interface.
Figure 7:
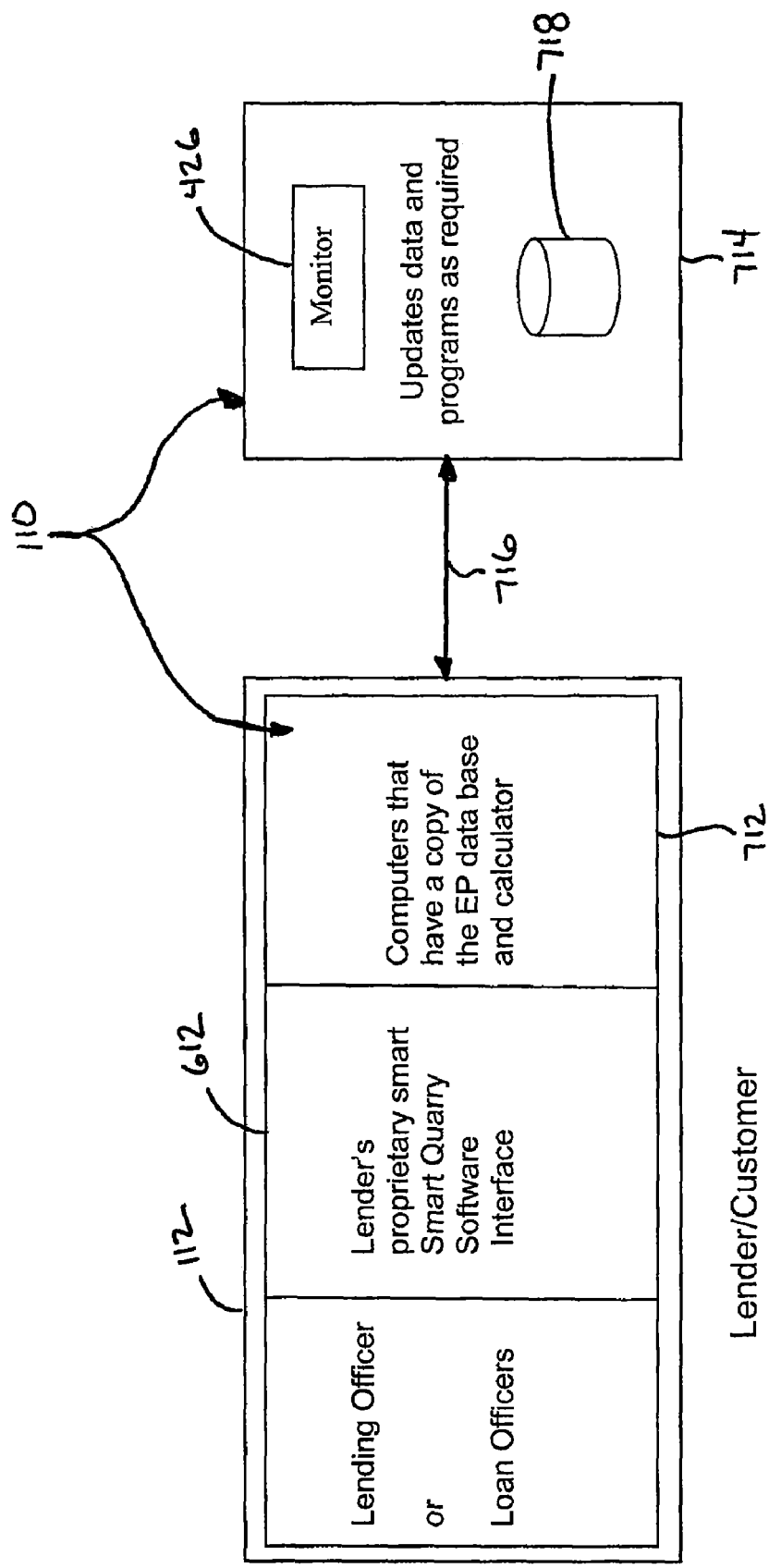
FIG. 7 is a block diagram illustrating a system for generating and monitoring field values of mortgage forms with a client site installation.

FIGS. 5, 6, and 7 describe variations of the above described system that may be implemented separately or together without departing from the scope of this application. Referring to FIG. 5, the loan originator or lending institution 112 may be in communication with a system internet site 512 hosted at a remote location. The internet site 512 may include a plurality of web pages allowing the loan originator or lending institution 112 to fill out an on-line questionnaire as denoted by line 514. The internet site 512 provides the loan information to the system 110. As described above, the system 110 generates the field values for the mortgage form (e.g. the good faith estimate or HUD1) and transmits the field values along with the transaction identification to the internet site 512. The internet site 512 communicates with the system 110. For example, the internet site 512 can provide the system 110 consumer information as denoted by line 516 and receive field values or tax and jurisdictional information as denoted by line 518. The internet site 512 provides the field values for the mortgage form and the transaction identification to the lending institution 112 as denoted by line 520.

In FIG. 6, the loan originator or lending institution 112 may have a customized software solution 612 for printing the mortgage forms or obtaining information from other entities such as title insurance, flood insurance, appraisal fees, etc. As such, the customized software 612, at the facility of the loan origination or lending institution, may provide the loan information to the system 110 at a remote site in XML format or through another predefined application programming interface (API) as denoted by line 614. Again, as described above, the system 110 generates the field values for the mortgage forms. The field values are transmitted along with a transaction identification number directly to the customized software 612 as denoted by line 616. As such, the field values and transaction identification number may be provided in an XML format or other predefined format, for example, through an application programming interface.

Now referring to FIG. 7, in one implementation, the system 110 may be particularly implemented on a server 712 located at the site of the loan originator or lending institution 112. In this implementation, the customized software 612 may be implemented on the same server as a portion of the system 110. In this scenario, the customized software 612 may interface with the system 110 through an application programming interface that may be provided through for example, a dynamic link library (DLL) service. In this implementation, at least the calculation module (418 from FIG. 4) and the databases (420 and 422 from FIG. 4) may be implemented on the server 712. In one example, the monitor module 426 may be implemented on a separate server 714 at a remote site. As such, the speed of calculating the field values for the mortgage forms is increased and not dependent on the internet connection 716.

The monitor module 426 receives updated tax and fee information either electronically from state and local jurisdictions in an automated fashion or manually through a user interface. In this scenario, the server 417 may include an updated tax and fee database 718 and update the tax and fee database 420 stored on the server 712 on a periodic basis. For example, the monitor module 426 may transfer information from the updated tax and fee database 718 to the tax and fee database 420 on the server 712 when the server 712 is less likely to be in use.

Figure 8:
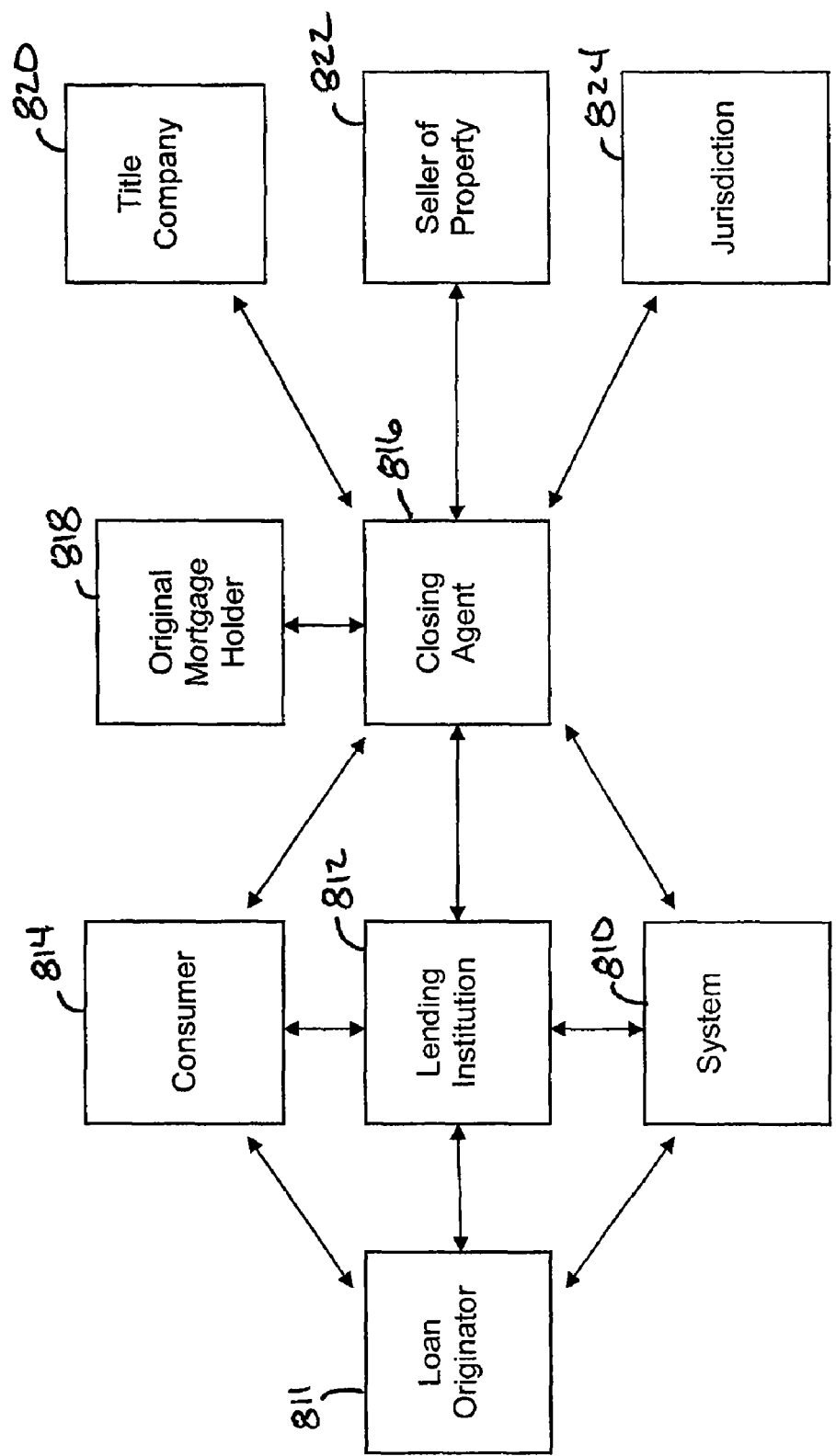
FIG. 8 is a block diagram illustrating a process for comparing field values of mortgage forms.

Further, the system denoted as 810 in FIG. 8 may have the capability to compare field values from one form to field values in another form. For example, a loan originator 811 may communicate with the system 810 to provide loan information to the system 810 and receive a good faith estimate from the system 810. As such, the loan originator would provide the good faith estimate to the consumer 814. Further, the good faith estimate and additional loan documentation may be provided from the originator 811 to the lending institution 812.

Based on additional information provided from the consumer 814, the lending institution 812 may request an additional good faith estimate from the system 810 or, alternatively, the system 810 may provide the lending institution 812 an updated good faith estimate based on a change in the tax or fee information for the jurisdiction of the loan. As such, the lending institution 812 would provide the updated good faith estimate to the consumer 814. The loan documentation from the lending institution as well as the good faith estimate would be provided to the closing agent 816 for closing of the loan.

The closing agent may be the lending institution, an attorney, a title company, or other entity, but is generically represented as the closing agent 816 for purposes of illustration. The closing agent 816 will have to compile the closing forms (e.g. the HUD1/1A forms) to be signed by the consumer and, for certain documents, to be recorded with the local recording jurisdiction. As such, the closing agent 816 may provide the loan information to the system 810 to generate the field values for closing forms. The system 810 may use the calculation module to access the tax and fee information and calculate the field values for the closing forms. The closing agent 816 then coordinates with the original mortgage holder 818 to pay the remaining balance of the mortgage, the title company 820 to procure title insurance, the seller of the property 822 if any remittance is due the seller of the property, and the jurisdictional entities 824 to pay the appropriate fees and taxes for the transaction.

Figure 9:
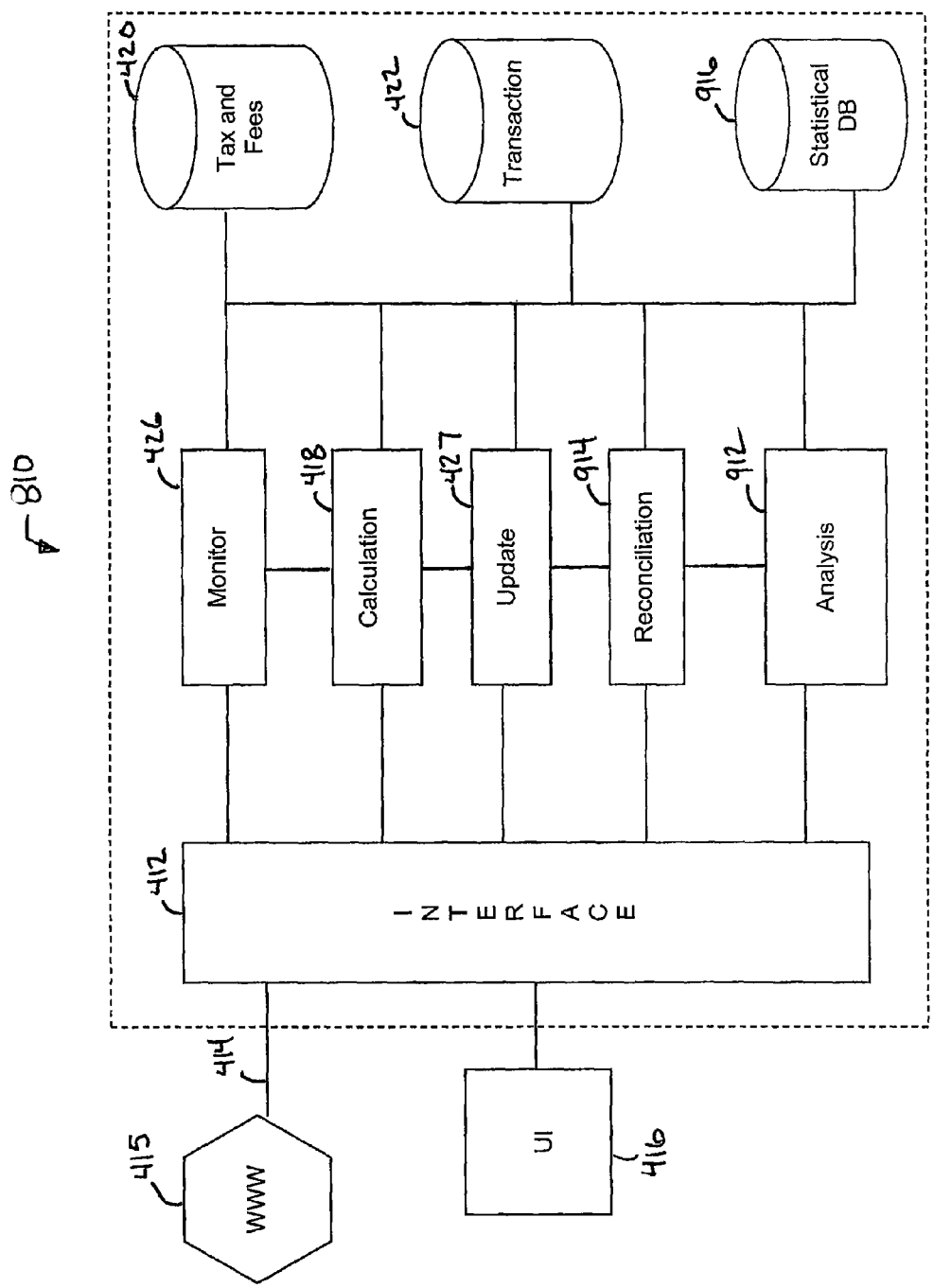
FIG. 9 is a block diagram illustrating a system for generating, monitoring, and comparing field values of mortgage forms.

One implementation of the system 810 is provided with more detail in FIG. 9. Relative to the calculation of the field data for each form, the system operates in a manner consistent with the description above, and like referenced numbers are used for corresponding modules. For example, the good faith estimate form may be calculated in a manner consistent with the description above in FIG. 4. Separately, the calculation of the closing forms (e.g. HUD1/1A) may be calculated in a manner consistent with the processes described above. In addition, the system 810 may also include a field value reconciliation module 914. The reconciliation module 914 compares related field values in different mortgage forms for variations between them.

After calculation of the field values for the closing forms, the reconciliation module 914 may compare field values for the good faith estimate forms to corresponding field values in the closing forms. As such, the reconciliation module 912 may access the transaction database 422 to retrieve the field values for the good faith estimate and closing forms. In addition, the reconciliation module 914 may store differences between the field values for the good faith estimate form and corresponding field values for the closing forms and store the identified differences in a statistical database 916 for later bulk analysis. More specifically, at the time the proposed HUD1/1A is submitted to the lender for approval to disburse funds, the actual taxes and fees are computed and the lender is informed of any loss resulting from the differences between actual and estimated taxes and recording fees. The difference and the reason for the difference may be stored in the statistical database 916 according to the transaction identification The reconciliation module 914 may calculate both the amount of under-estimation of the "estimated" transfer taxes, and the amount of under-estimation of the total of a class of costs that includes recording fees. Accordingly, the reconciliation module 914 closes the life loop of a successful transaction by comparing the HUD1/1A information provided by the closing agent to the latest GFE sent to the borrower. The reconciliation module 914 may generate a reconciliation report of field values between the lender's latest GFE transaction record content and the closing agent's estimated or actual information about that same transaction. For the purposes of (1) obtaining lender approval to fund, and (2) to enter field values into the HUD1/1A. Further, the reconciliation module 914 may generate reconciliation reports to both lenders and closing agents. The reconciliation module 914 may provide the reports to the interface module 412 for transmission to the Loan Originator 811, Lending Institution 812, or Closing Agent 816, for example over the network connection 414.

The GFE form, breaks out the total of recording fees (field 7) and the total of transaction taxes (field 8) into separate field values, as shown in Table 1 below.

TABLE 1

7 Government recording charges
  These charges are for state and local fees to record your loan and title documents.
8. Transfer taxes These charges are for state and local fees on mortgages and home sales.

These field values have corresponding field values on the HUD1/1A forms, detailing recording fees and transaction taxes. The corresponding field values are shown in Table 2 below. Note that the parenthetical "(from GFE #7)" and "(GFE #8)" are misleading. The data to be posted in the HUD1/1A forms are the actual amounts, not the matching GFE amounts.

Actual "Government recording charges" (recording fees) are posted in Group 1200, fields 1201-1202. Actual transfer taxes (transaction taxes) are totaled on Group 1200, field 1203, and are detailed in fields 1204-1206.

TABLE 2

| | | | |
|---|---|---|---|
| 1200. Government Recording and Transfer Charges | | | |
| 1201. Government recording charges | | | (from GFE #7) |
| 1202. Deed $ | Mortgage $ | Releases $ | |
| 1203. Transfer taxes | | | (from GFE#8) |
| 1204. City/County tax/ stamps | Deed $ | Mortgage $ | |
| 1205. State tax/stamps | Deed $ | Mortgage $ | |
| 1206. | | | |

Further down on the HUD1/1A is a comparison of good faith estimates to actual costs, as shown in Table 3. The amounts in the last two columns compare the good faith estimate of transfer taxes with the good faith estimate from the GFE form. This comparison can be crucial to developing a settlement computation procedure as well as a post-closing analytical system because the borrower gets the advantage if the transfer tax indicated on the GFE is greater than the actual transfer taxes. Therefore if the estimated taxes totaled $1,600, but the actual taxes to be paid are now $2,000, the $2,000 figure is entered below on line 1203, and the lender would post a $400 loss to balance its books with the HUD1/1A.

TABLE 3

| Comparison of Good Faith Estimate (GFE) and HUD-1 Charges | | Good | |
|---|---|---|---|
| Charges That Cannot Increase | HUD-1 Line Number | Faith Estimate | HUD-1 |
| Our origination charge | #801 | | |
| Your credit or charge (points) for the specific interest rate chosen | #802 | | |
| Your adjusted origination charges | #803 | | |
| Transfer taxes | #1203 | | |

The analysis module 912 analyzes many transactions for trends, compliance audits and adjustment of estimates. The analysis module 912 may perform statistical analysis of stored historical records of transaction estimated and actual field values. Based on the stored historical records, the analysis module 912 may generate reports to assist lenders in better handling the requirements pertaining to field values in good faith estimates (mortgage forms), including loss analysis due to breaking tolerances.

Further, the analysis module 912 may compare penalty payments over a period of time (i.e., monthly) to determine trends in the types of differences. As such, internal changes may be tracked that may also result in sending revised GFEs, including, for example, a change in the consideration of a property purchase price or a change in the amount of the mortgage loan. The analysis module 912 may provide the reports to the interface module 412 for transmission to the Loan Originator 811, Lending Institution 812, or Closing Agent 816, for example over the network connection 414.

As described above, the analysis module 912 or monitoring module 426 may generate reports identifying errors for each account or a group of accounts for a particular lender. One example of a report is provided in FIG. 10. Upon request, the system may provide a single account report 1010 for each account reportable. The single account report 1010 may include many items, for example, a date that a change in the tax or fee is posted 1012, a transaction identification number 1014, an applicant number 1016, a date of the last inquiry for the local jurisdiction 1018, the local jurisdiction 1020, an explanation of the change 1022, an estimate closing date of the loan 1024, the amount of consideration 1026, the previously calculated field value for the GFE transfer tax 1028, the updated field value for the GFE transfer tax 1030, the change in transfer tax 1032, account specific notes 1034, and an action recommendation for the user 1036 (such as sending a revised GFE). The report may be generated on a web page, emailed to the user (e.g. the originator or lender), mailed to the user, or communicated in some other means to the user or consumer.

Alternatively, when there are many changes to outstanding applicants, the results may be provided in a group report 1110, as illustrated in FIG. 11. The group account report 1110 may include many items, for example, an explanation 1112 of the change in the tax or fee, the item on the mortgage form that is affected by the change 1114, a date that a change in the tax or fee is posted 1116, an action recommendation for the user 1118 (such as sending a revised GFE), an applicant number 1120, a date of the last good faith estimate 1122, the previously calculated field value for the GFE transfer tax 1124, the updated field value for the GFE transfer tax 1126, the amount change in transfer tax 1128, and the percentage change in transfer tax 1130. Although it is understood that each of the items provided in the single account report may also be provided in the table format of the group report 1110. The report may be generated on a web page, emailed to the user (e.g. the originator or lender), mailed to the user, or communicated in some other means to the user. The report may also be provided in an Excel or equivalent database to make it possible for the system to prepare automated GFEs if the change is deemed material.

Referring again to FIG. 9, the analysis module 912 may analyze the differences stored in the form comparison database 916 to identify commonly occurring errors in form preparation and/or information capture. Further, the analysis module 912 may identify trends relative to particular lenders or jurisdictions in minimizing differences between the good faith estimate provided to the consumer and the HUD1/1A forms used at closing. In addition, the differences from the statistical database 916 and statistics generated from the differences may be transmitted from the lender or loan originator 112 on a periodic basis through the network connection 414, for example over the internet 415. In addition, the statistical information may be presented to the user interface 416 for display to the user or printing in report format.

Figure 12:
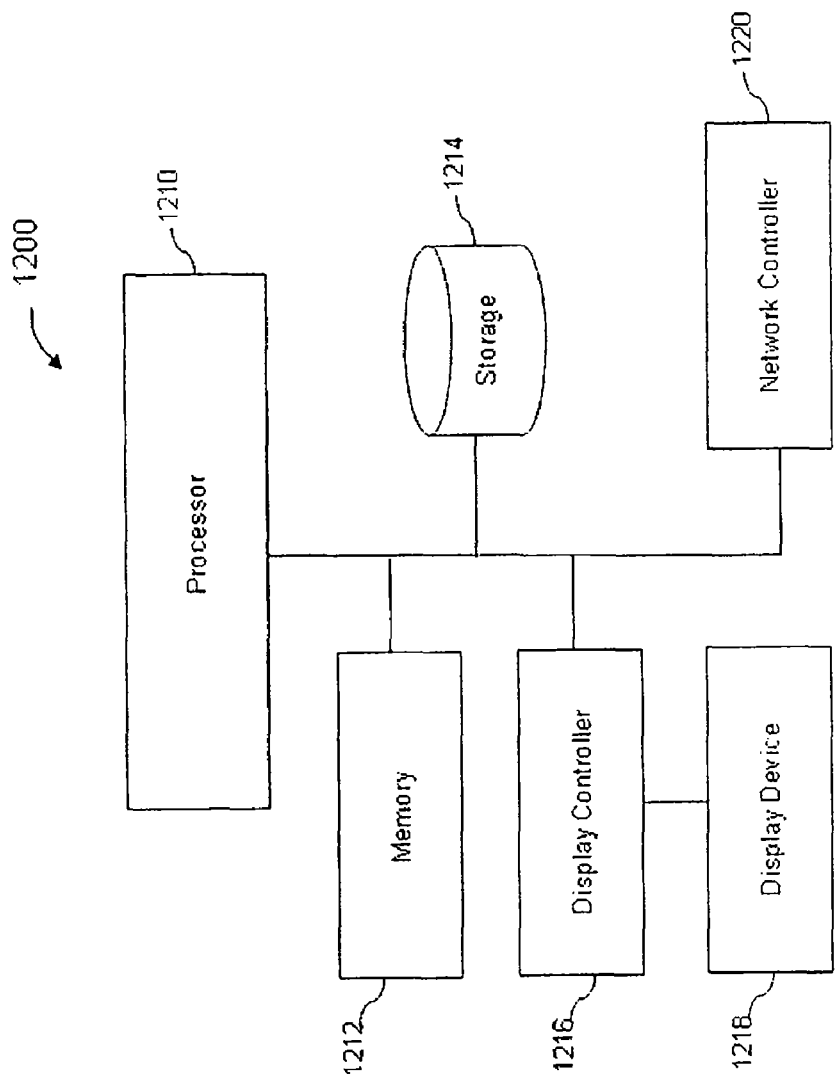
FIG. 12 is a block diagram of a computer for implementing servers or modules of the system.

Any of the modules, controllers, servers, or engines described may be implemented in one or more computer systems. One exemplary system is provided in FIG. 12. The computer system 1200 includes a processor 1210 for executing instructions such as those described in the methods discussed above. The instructions may be stored in a computer readable medium such as memory 1212 or a storage device 1214, for example a disk drive, CD, or DVD. The computer may include a display controller 1216 responsive to instructions to generate a textual or graphical display on a display device 1218, for example a computer monitor. In addition, the processor 1210 may communicate with a network controller 1220 to communicate data or instructions to other systems, for example other general computer systems. The network controller 1220 may communicate over Ethernet or other known protocols to distribute processing or provide remote access to information over a variety of network topologies, including local area networks, wide area networks, the internet, or other commonly used network topologies.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from the spirit of this invention, as defined in the following claims.

I claim:

1. A system for preparing a mortgage form comprising:
a computer;
a database containing jurisdictional tax and fee information used to calculate field values for the mortgage form;
a monitoring module in communication with the database, the monitoring module identifying a change in the jurisdictional tax and fee information used to calculate field values for the mortgage form;
a calculation module configured to calculate the field values for the mortgage form based on the monitoring module identifying changes in the database, the calculation module being implemented on the computer;
a transactional database configured to store field values for each mortgage form based on a transaction identification;
wherein the monitoring module is configured to transmit a notification based on the change in jurisdictional and tax information.

2. The system according to claim 1, wherein the monitoring module is configured to transmit the field values of the mortgage form calculated by the calculation module based on the change in jurisdictional and tax information.

3. The system according to claim 1, wherein monitoring module queries transactions from the transactional database based on a transaction jurisdiction according to a change in the tax and fee information for the transaction jurisdiction and the output module sends the notification based on the query.

4. The system according to claim 1, wherein monitoring module queries transactions from the transactional database based on a transaction closing date according to a change in the tax and fee information for the transaction jurisdiction and the output module sends the notification based on the query.

5. The system according to claim 1, further comprising a reconciliation module configured to identify differences in the field values calculated by the calculation module relative to previously calculated field values, an analysis module being configured to transmit a notification when a difference exists between the field values identified by the reconciliation module and the previously calculated field values.

6. The system according to claim 1, wherein monitoring module is configured to send a request to a jurisdiction for updated jurisdictional tax and fee information.

7. The system according to claim 6, wherein the request is transmitted through a network connection over the internet.

8. The system according to claim 1, wherein the notification is transmitted through a network connection over the internet.

9. The system according to claim 1, wherein mortgage form is a good faith estimate form.

10. A system for preparing a mortgage form comprising:
a computer;
a database containing jurisdictional tax and fee information used to calculate field values for the mortgage form;
a monitoring module in communication with the data base, the monitoring module identifying changes in the jurisdictional tax and fee used to calculate field values for the mortgage form;
a calculation module configured to calculate the field values for the mortgage form, wherein the calculation module is implemented on the computer;
a reconciliation module configured to identify differences in the field values relative to previously calculated field values for a previously calculated form stored in the a transaction database; and
an analysis module configured to transmit a notification of the difference between the field values and the previously calculated field values from the previously calculated form.

11. The system according to claim 10, wherein the transactional database is configured to store field values for each mortgage form based on a transaction identification.

12. The system according to claim 11, wherein calculation module stores the field values in the transactional database for the mortgage form based on the transactional identification.

13. The system according to claim 12, wherein the reconciliation module retrieves the previous field values for the previous mortgage form based on the transactional identification.

14. The system according to claim 10, further comprising an analysis module configured to identify common differences between the field values for the mortgage form and the field values for the previously calculated mortgage form.

15. The system according to claim 10, wherein the mortgage form is a HUD1 or HUD1A form and the previously calculated form is a good faith estimate form.

16. The system according to claim 15, further comprising a statistical database in communication with the analysis module, the analysis module storing differences between field values for the mortgage form and the field values for the previously calculated mortgage form in the statistical database.

17. A method for preparing a mortgage form comprising:
storing jurisdictional tax and fee information;
calculating field values for the mortgage form using the jurisdictional tax and fee information, wherein the calculating of the field values is performed by a computer;
storing field values for each mortgage form based on a transaction identification;
identifying changes in the jurisdictional tax and fee used to calculate field values for the mortgage form;
transmitting a notification based on the change in jurisdictional and tax information.

18. A method for preparing a mortgage form comprising:
storing jurisdictional tax and fee information;
calculating field values for the mortgage form using the jurisdictional tax and fee information, wherein the calculating of the field values is performed by a computer;
identifying changes in the jurisdictional tax and fee used to calculate field values for the mortgage form;
identifying differences in the field values relative to previously calculated field values for a previously calculated form stored in the a transaction database; and
transmitting a notification of the difference between the field values and the previously calculated field values from the previously calculated form.

* * * * *